United States Patent [19]

Ueno et al.

[11] Patent Number: 4,579,925
[45] Date of Patent: Apr. 1, 1986

[54] POWDER COATING COMPOSITION

[75] Inventors: Kazuo Ueno, Yokohama; Minoru Yokoshima, Yamaguchi; Tomotaka Onizuka, Hiratsuka; Kazuhiko Sato, Hiratsuka; Hiroyuki Okumura, Hiratsuka, all of Japan

[73] Assignees: Nippon Kayaku Kabushiki Kaisha; Mitsubishi Gas Chemical Company, Inc., both of Tokyo, Japan

[21] Appl. No.: 727,063

[22] Filed: Apr. 25, 1985

[30] Foreign Application Priority Data

Aug. 27, 1984 [JP] Japan .................. 59-178065
Mar. 20, 1985 [JP] Japan .................. 60-56619

[51] Int. Cl.$^4$ .................. C08F 20/28
[52] U.S. Cl. .................. 526/266
[58] Field of Search .................. 526/266, 273

[56] References Cited

U.S. PATENT DOCUMENTS 3,893,985  7/1975  Papa .................. 526/266
3,933,857  1/1976  Hanyuda .................. 526/266

FOREIGN PATENT DOCUMENTS 13928  4/1973  Japan .
29745  3/1976  Japan .
157616  7/1980  Japan .
91157  5/1984  Japan .

*Primary Examiner*—Paul R. Michl
*Attorney, Agent, or Firm*—Banner, Birch, McKie & Beckett

[57] ABSTRACT

A powder coating composition comprising an ethylenically unsaturated compound (a) represented by the general formula

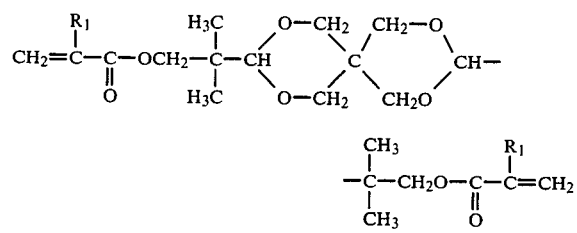

(wherein $R^1$ is H or $CH_3$) and a polymerization catalyst (b) or said ethylenically unsaturated compound (a), a polymerization catalyst (b) and an epoxy (meth)acrylate (c) obtained by reacting a polyepoxide compound with an $\alpha,\beta$-unsaturated monocarboxylic acid, wherein the weight ratio of the component (a)/the component (c) is 90 to 20 parts by weight/10 to 80 parts by weight.

10 Claims, No Drawings

POWDER COATING COMPOSITION

BACKGROUND OF THE INVENTION

1. Field of the Invention

This invention relates to a powder coating composition. More particularly, the invention relates to a powder in-mold coating composition comprising an ethylenically unsaturated compound having a particular structure and a polymerization catalyst or said ethylenically unsaturated compound, an epoxy (meth)acrylate and a polymerization catalyst.

2. Description of the Prior Art

As described in, for example, Japanese Patent Publication No. 13928/1973, Japanese Patent Application Kokai (Laid-Open) No. 157616/1980, Japanese Patent Application Kokai (Laid-open) No. 91157/1984, etc., there have hitherto been known thermosetting in-mold coating compositions comprising (1) a base preparation obtained by uniform mixing of (a) a main component which is a blend of an unsaturated polyester resin and a liquid or solid vinyl or allyl compound as a crosslinking agent and (b) a polymerization catalyst and, if necessary, (2) additives such as a pigment, a releasing agent, a filler, a curing accelerator and the like.

When these compositions are applied on the surfaces of molded articles of polyester resin, the resulting coating layers are insufficient in surface hardness and are not sufficiently satisfactory in scratch resistance and wear resistance.

Molded articles of fiber-reinforced plastics having a gelcoat layer are generally produced by firstly spraying into a molding die of room temperature or heated to about 60° C. with a liquid gelcoat resin such as an unsaturated polyester resin, a polyester acrylate resin, an epoxy acrylate resin or the like with a gun or coating said surface with said gelcoat resin with a brush to form a gelcoat layer and then applying a hand lay-up method, a spray-up method or a casting method. Since this production process is poor in productivity, a molding process was studied in which a liquid gelcoat resin is sprayed or coated onto a heated molding die, then a SMC (sheet molding compound), a BMC (bulk molding compound) or other molding compound is placed on the gelcoat layer or the die, and is molded under pressure. However, in this molding process, since the gelcoat resin contains polymerizable unsaturated monomers having a volatility such as styrene and the like, working environments are very bad and further, since the monomers vaporize, there can not be formed a gelcoat layer having a desired performance.

To improve these drawbacks, a process was developed which uses diallyl phthalate or a prepolymer thereof both having a very low volatility as the polymerizable unsaturated monomer for the gelcoat resin (Japanese Patent Publication No. 29745/1976). In this process, working environments are improved; however, the gelcoat layer formed tends to yellow when heated, is brittle and has a low hardness.

SUMMARY OF THE INVENTION

To improve the above mentioned drawbacks, the present inventors made an extensive study and as a result, have found that a powder coating composition comprising an ethylenically unsaturated compound (a) represented by the general formula

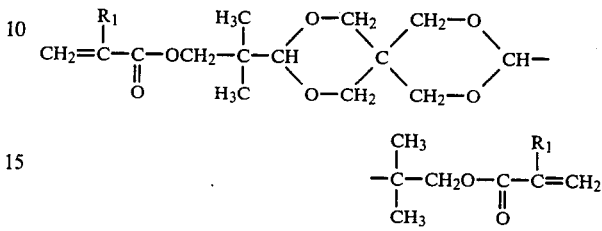

(wherein $R_1$ is H or $CH_3$) and a polymerization catalyst (b) excels in the above mentioned characteristics, particularly in hardness and weather resistance of coating or gelcoat layer. The present inventors also have found that, when the above composition is mixed with an epoxy (meth)acrylate (c) obtained by reacting a polyepoxide compound with an α,β-unsaturated monocarboxylic acid, the resulting composition is superior in heat shock resistance after curing to the composition comprising the components (a) and (b). Based on these findings, the present invention has been completed.

The object of the present invention is to provide a powder coating composition, especially in-mold coating composition excellent in hardness, weather resistance and heat shock resistance of coating or gelcoat layer.

According to the present invention, there is provided a powder in-mold coating composition comprising an ethylenically unsaturated compound (a) represented by the general formula

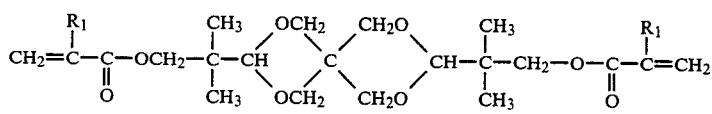

(wherein $R_1$ is H or $CH_3$) and a polymerization catalyst (b), as well as a powder in-mold coating composition comprising an ethylenically unsaturated compound (a) represented by the above general formula, a polymerization catalyst (b) and an epoxy (meth)acrylate (c) obtained by reacting a polyepoxide compound with an α,β-unsaturated monocarboxylic acid.

DETAILED DESCRIPTION OF THE INVENTION

The ethylenically unsaturated compound used in the composition of this invention is spiroglycol diacrylate or dimethacrylate obtained by reacting 3,9-bis(1,1-dimethyl-2-hydroxyethyl)2,4,8,10-tetraoxaspiro[5,5]undecane (referred to as spiroglycol) with acrylic acid or methacrylic acid. This compound is a light yellow solid having a melting point of 117° to 120° C. (spiroglycol diacrylate) or 83° to 87° C. (spiroglycol dimethacrylate).

The polyepoxide compound, used for producing the epoxy (meth)acrylate component of the composition of the present invention is preferably a polyepoxide compound having an epoxy equivalent of 130 or more.

Since the composition of the present invention is used in a powder form, the polyepoxide compound is more preferably a polyepoxide compound having an epoxy equivalent of 300 or more. As such an epoxy compound, there can be mentioned, for example, condensation products obtained by reacting an epihalohydrin such as epichlorohydrin or methylepichlorohydrin with a bisphenol type compound or a novolak. Typical examples of the bisphenol type compound include 2,2-bis(4-hydroxyphenyl)propane and 2,2-bis(4-hydroxyphenyl)methane. As the novokak, there can be mentioned, for example, condensation products obtained by reacting a phenol type compound such as resorcinol, tetrahydroxydiphenylmethane, phenol or cresol with formaldehyde. There can also be used a polyepoxide compound obtained by reacting a polyepoxide compound having a low epoxy equivalent with a phenol type compound to increase the epoxy equivalent of the former. These polyepoxide compounds can be used alone or in combination of two or more.

As the α,β-unsaturated monocarboxylic acid to be reacted with the above polyepoxide compound, there can be mentioned, for example, acrylic acid and methacrylic acid. These acids may be used, if necessary, together with a saturated polycarboxylic acid such as an aromatic dicarboxylic acid such as isophthalic acid or terephthalic acid or an aliphatic dicarboxylic acid such as succinic acid or adipic acid.

In order to obtain an epoxy (meth)acrylate from the polyepoxide compound and the α,β-unsaturated monocarboxylic acid, they are reacted so that the equivalent ratio of the epoxy group and the carboxyl group preferably becomes 1:0.8 to 1:1.2. Reaction conditions such as a reaction temperature and the like may be those known per se. For example, the reaction is conducted under the presence of an esterification catalyst preferably at a temperature of 80° to 150° C. As the esterification catalyst, there can be used known catalysts such as secondary amines, tertiary amines, inorganic or organic acid salts of these amines, metal salts of phthalic acid, metal halides and the like.

The composition of the present invention, being thermosetting, is melted at the melting or softening point or a higher temperature and then cured by a polymerization reaction. Use of a polymerization catalyst is necessary in this curing. It is preferable to select a catalyst having an appropriate decomposition temperature depending upon the molding conditions, the pot life and the gell time of the composition employed. As such a polymerization catalyst, there can be used (1) organic peroxides such as diacyl peroxides, ketone peroxides, dialkyl peroxides, alkyl peresters, percarbonates, peroxyketals and hydroperoxides. Specific examples of these organic peroxides are benzoyl peroxide, methyl ethyl ketone peroxide, di-tert.-butyl peroxide, dicumyl peroxide, tert.-butyl peroxybenzoate, tert.-butylperoxy-2-ethylhexanoate, 1,3-bis(tert.-butylperoxy-isopropyl)-benzene and 1,1-di-tert.-butylperoxy-3,3,5-trimethylcyclohexane. These organic peroxides can be used alone or in combination of two or more. The amount of the polymerization catalyst used is preferably 0.5 to 3.0% by weight based on the ethylenically unsaturated compound (a) or on the total amount of the ethylenically unsaturated compound (a) and the epoxy (meth)acrylate (c). The amount can vary within this range depending upon working conditions, molding conditions, etc.

In the present composition, the ethylenically unsaturated compound (a) and the epoxy (meth)acrylate (c) are used in a weight ratio of 90 to 20 parts by weight versus 10 to 80 parts by weight. When (a)/(c) exceeds 90/10, the coating or gelcoat layer formed is insufficient in heat shock resistance. When (a)/(c) is smaller than 20/80, there occur in some cases that the superior characteristics of the ethylenically unsaturated compound (a), namely, spiroglycol diacrylate or dimethacrylate is not exhibited.

The present composition can generally be obtained by uniformly mixing an ethylenically unsaturated compound (a) represented by the previously mentioned general formula and a polymerization catalyst (b), or the component (a), an epoxy (meth)acrylate (c) and the polymerization catalyst (b), if necessary, together with additives such as fillers and the like, all in powder state, or by mixing the components (a) and (b) or (a), (b) and (c) all in molten state, cooling and powderizing the resulting mixture, and, if necessary, adding to the resulting powder additives such as fillers and the like. Optionally, the present composition can be obtained by mixing a blend of an ethylenically unsaturated compound (a) in powder state, a polymerization catalyst and, if necessary, additives such as fillers and the like with a blend of an epoxy (meth)acrylate, a polymerization catalyst and, if necessary, additives such as fillers and the like. The present composition ordinarily has a particle size preferably of 20 to 200 microns and more preferably of 80 to 200 microns.

To the present composition can further be incorporated, if necessary, an appropriate proportion of at least one member selected from the group consisting of coloring agents, inorganic or organic fillers such as calcium carbonate and aluminum hydroxide, plasticizers, fluidity modifiers such as silica, etc.

The present composition is applied in such a way that the composition is allowed to adhere in a powder state to the surface of a molding die heated to 90° to 200° C. and is melted and cured to form a coating or gelcoat layer, then a molding compound such as a SMC, a BMC or the like is placed on the gelcoat layer or the die, and they are subjected to molding to obtain a molded article covered with the coating or gelcoat layer.

As mentioned previously, spiroglycol diacrylate or dimethacrylate used in the present composition has a relatively high melting point; therefore, it is very easily powderized in production of the present composition.

The molded articles covered with the coating or gelcoat layer using the present composition have excellent properties such as very high hardness and excellent scratch resistance, wear resistance and heat resistance. It is assumed that the excellent properties of the molded articles are caused by the characteristic structure of the spiroglycol diacrylate or dimethacrylate which is one of the constituting components in the present composition. Also, the coating has much improved weather resistance compared with coatings obtained from conventional coating agents using aromatic compounds.

The present composition is cured by a polymerization reaction, namely, crosslinking reaction caused by the functional groups, namely, unsaturated groups of spiroglycol diacrylate or dimethacrylate which is one constituting component of the present composition. These functional groups cause a crosslinking reaction more easily in a closed system free from air than in air. Accordingly, the present composition can be used preferably as a powder coating composition for in-mold coating whose curing is conducted in a closed system such as the inside of a die, rather than as an ordinary powder coating whose curing is conducted in air. The present composition can be applied in, for example, surface coating of bath tubs, wash stands, shower strays, kitchen units, counter units, etc.

Having excellent properties as a powder in-mold coating composition, the present composition can provide molded articles having a coating or gelcoat layer low in discoloration when heated, high in transparency and hardness and good in weather resistance.

Next, the present invention will be explained in more detail by way of Examples and Reference Examples, in which "parts" means "parts by weight". However, the present invention is in no way restricted thereto.

EXAMPLE 1

50 parts of spiroglycol diacrylate in powder state, 1 part of PERKADOX 14/40 [polymerization catalyst containing 40% of 1,3-bis(tert.-butylperoxy-isopropyl-benzene, manufactured by KAYAKU NOURY CORPORATION]and 0.5 part of AEROSIL #300 (highly dispersed fine particle silica, manufactured by NIPPON AEROSIL CO., LTD.) were mixed and powderized. The resulting powder was passed through a 200 mesh sieve to obtain a powder coating composition. This composition was placed in an aluminum cup and heated to 140° C. In 15 minutes, gellation occured. The composition was coated on a glass plate and heated for 60 minutes at 150° C. to obtain a cured coating. The cured coating had a surface hardness of 8H or more pencil hardness as measured in accordance with JIS K 5400. (The surface hardness was measured hereunder in the same way.)

EXAMPLE 2

50 parts of spiroglycol diacrylate in powder state, 1 part of TRIGONOX 29/40 [polymerization catalyst containing 40% of 1,1-ditertiarybutylperoxy-3,3,5-trimethylcyclohexane, manufactured by KAYAKU NOURY CORPORATION]and 0.5 part of AEROSIL #300 were mixed. The resulting mixture was placed in an aluminum container and melted for 5 minutes at 130° C. After cooling, the molten mixture was powderized and the resulting powder was passed through a 200 mesh sieve to obtain a fine powder composition. This composition was placed in an aluminum cup and heated to 140° C. In 30 seconds, gellation occured.

The composition was coated on a glass plate and heated for 60 minutes at 150° C. to obtain a cured coating. The cured coating had a surface hardness of 8H or more pencil hardness.

EXAMPLE 3

50 parts of spiroglycol dimethacrylate in powder state, 1 part of PERKADOX 14/40 and 0.5 part of AEROSIL #300 were treated in the same manner as in Example 1 to obtain a powder composition. This composition was heated to 150° C. In 12 minutes, the composition caused gellation. Also, the composition was coated on a glass plate and heated for 60 minutes at 150° C. to obtain a coating having a surface hardness of 8H or more pencil hardness.

EXAMPLE 4

100 parts of a spiroglycol diacrylate, 1.0 part of AEROSIL #300 and 2 parts of TRIGONOX 29/40 were mixed and powderized to obtain a powder. The powder was passed through a 200 mesh sieve to obtain a fine powder composition. This is designated as "SGC-1".

REFERENCE EXAMPLE 1 (SYNTHESIS OF EPOXY ACRYLATE)

Into a 5 liter reactor equipped with a stirrer, reflux condenser and a thermometer were fed 1,148.8 g of a bisphenol type polyepoxide compound having an epoxy equivalent of 250 [brand name "EPIKOTE 828", manufactured by Yuka Shell Epoxy K. K.], 549.5 g of 2,2-bis(4-hydroxyphenyl)propane and 0.8 g of triphenylphosphine. They were reacted for 2 hrs. at 160° to 180° C. to obtain a bisphenol type polyepoxide compound having an epoxy equivalent of 1,300.

1,699.1 g of this polyepoxide compound, 94.3 g of acrylic acid, 0.72 g of toluhydroquinone and 3.6 g of dimethylbenzylamine were fed into a reactor of same type as used above and were reacted for 1.5 hrs. at 170° C. to obtain an epoxy acrylate having an acid value of 1.1 (mgKOH/g).

REFERENCE EXAMPLE 2 (SYNTHESIS OF EPOXY ACRYLATE)

Into a reactor of same type as used in Reference Example 1 were fed 1,641 g of a bisphenol type polyepoxide compound having an epoxy equivalent of 2,000 (brand name "EPIKOTE 1007", manufactured by Yuka Shell Epoxy K. K.), 59 g of acrylic acid, 0.68 g of toluhydroquinone and 3.5 g of dimethylbenzylamine. They were reacted for 1.5 hrs. at 170° C. to obtain an epoxy acrylate having an acid value of 2.0 (mgKOH/g).

REFERENCE EXAMPLE 3

100 parts of the epoxy acrylate powder obtained in Reference Example 1, 1.0 part of AEROSIL #300 and 2.0 parts of TRIGONOX 29/40 were mixed and powderized to obtain a powder. The powder was passed through a 200 mesh sieve to obtain a fine powder composition. This is designated as "EAC-1".

REFERENCE EXAMPLE 4

100 parts of the epoxy acrylate powder obtained in Reference Example 2, 1.0 part of AEROSIL #300 and 2.0 parts of TRIGONOX 29/40 were mixed and powderized to obtain a powder. The powder was passed through a 200 mesh sieve to obtain a fine powder composition. This is designated as "EAC-2".

EXAMPLE 5

30 parts of the fine powder composition "EAC-1" obtained in Reference Example 3 and 70 parts of the fine powder composition "SGC-1" obtained in Example 4 were mixed and passed through a 200 mesh sieve to obtain a fine powder coating composition. This is designated as "SEC-1".

EXAMPLE 6

50 parts of the fine powder composition "EAC-1" obtained in Reference Example 3 and 50 parts of the fine powder composition "SGC-1" obtained in Example 4 were mixed and passed through a 200 mesh sieve to obtain a fine powder coating composition. This is designated as "SEC-2".

EXAMPLE 7

70 parts of the fine powder composition "EAC-1" obtained in Reference Example 3 and 30 parts of the fine powder composition "SGC-1" obtained in Example 4 were mixed and passed through a 200 mesh sieve to obtain a fine powder coating composition. This is designated as "SEC-3".

EXAMPLE 8

50 parts of spiroglycol diacrylate, 50 parts of the epoxy acrylate obtained in Reference Example 2 and 1.0 part of AEROSIL #300 were mixed, melted at 150° to 160° C., cooled and powderized to obtain a powder. 100 parts of this powder was mixed with 2.0 parts of TRIGONOX 29/40 as a polymerization catalyst. The mixture was powderized and passed through a 200 mesh sieve to obtain a fine powder coating composition. This is designated as "SEC-4".

The powder coating compositions obtained in Examples 5 to 8 and Reference Examples 3 and 4 as well as a diallyl phthalate prepolymer (designated as "DAP-1") known as a gelcoat resin were each sprayed onto the surface of a die heated to 145° C. to form a gelcoat layer precursor having a thickness of 0.4 to 0.5 mm. Thereon was placed a polyester SMC. They were cured and molded at 145° C. under pressure to obtain a FRP molded article having a gelcoat layer on the surface. Each molded article obtained was tested for the following properties.

Surface gloss: 60 specular gloss; Measured in accordance with JIS K 5400.
Discoloration resistance when heated: Discoloration resistance of surface, 180° C. ×2 hrs.
Surface hardness: Pencil hardness, measured in accordance with JIS K 5400.
Heat shock resistance: -30° to 80° C., each 10 minutes for 1 cycle and 3 cycles.
Weather resistance: Discoloration and fading in 160 hrs. of weathering, measured in accordance with JIS K 5400.

The results are shown in Table 1.

As appreciated from Table 1, in the gelcoat layers produced from the present compositions, surface hardness was very high; surface gloss was good; discoloration resistance when heated was hardly found; and heat shock resistance and weather resistance were very excellent.

TABLE 1

| Sample | Formability of gelcoat layer | Surface hardness of gelcoat layer | Surface gloss (60° specular gloss) | Discoloration resistance when heated, Δb | Heat shock resistance | | Weather resistance |
|---|---|---|---|---|---|---|---|
| | | | | | 1 cycle | 3 cycles | |
| SGC-1 (Example 4) | Good | 8H or more | 91.4 | 2> | Good | Partially cracked | No change |
| SEC-1 (Example 5) | Good | 8H or more | 92.6 | 2> | Good | Good | No change |
| SEC-2 (Example 6) | Good | 7H | 93.4 | 2> | Good | Good | No change |
| SEC-3 (Example 7) | Good | 6H | 92.8 | 2> | Good | Good | No change |
| SEC-4 (Example 8) | Good | 7H | 92.7 | 2> | Good | Good | No change |
| EAC-1 (Reference Example 3) | Good | 3H | 90.8 | 2> | Good | Good | Slight yellowing |
| EAC-2 (Reference Example 4) | Good | 3H | 90.4 | 2> | Good | Good | Slight yellowing |
| DAP-1 known coating resin | Good | 4H | 80.4 | 8 | Good | Cracked | Slight yellowing |

What is claimed is:

1. A powder coating composition comprising an ethylenically unsaturated compound (a) represented by the general formula

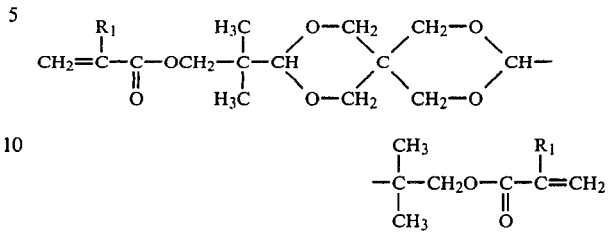

(wherein $R_1$ is H or $CH_3$) and a polymerization catalyst (b).

2. A powder coating composition comprising an ethylenically unsaturated compound (a) represented by the general formula

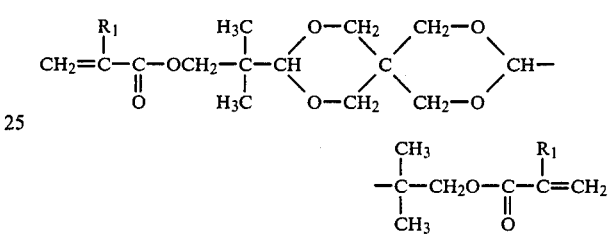

(wherein $R_1$ is H or $CH_3$), a polymerization catalyst (b) and an epoxy (meth)acrylate (c) obtained by reacting a polyepoxide compound with an α,β-unsaturated monocarboxylic acid, wherein the weight ratio of the components (a)/(c) is 90 to 20 parts by weight / 10 to 80 parts by weight.

3. A composition according to claim 1 or 2, wherein $R_1$ of the general formula is H.

4. A composition according to claim 1 or 2, wherein the polymerization catalyst is at least one member selected from diacyl peroxides, ketone peroxides, dialkyl peroxides, alkyl peresters, percarbonates, peroxyketals and hydroperoxides.

5. A composition according to claim 1 or 2, wherein the polymerization catalyst is used in an amount of 0.5 to 3.0% by weight based on the ethylenically unsaturated compound (a) or based on the total amount of the ethylenically unsaturated compound (a) and the epoxy (meth)acrylate (c).

6. A composition according to claim 2, wherein the polyepoxide compound has an epoxy equivalent of 300 or more.

7. A composition according to claim 2, wherein the α,β-unsaturated monocarboxylic acid is acrylic acid or methacrylic acid.

8. A composition according to claim 6, wherein the polyepoxide compound is obtained by reacting an epihalohydrin with a bisphenol type compound.

9. A composition according to claim 8, wherein the bisphenol type compound is 2,2-bis(4-hydroxyphenyl)-propane.

10. A composition according to claim 1 or 2, wherein at least one member selected from coloring agents, inorganic or organic fillers, plasticizers and fluidity modifiers is incorporated.

* * * * *